United States Patent Office 3,206,432
Patented Sept. 14, 1965

3,206,432
MODIFIED POLYMERS
Carl G. Schwarzer, Walnut Creek, Calif., assignor to Shell Oil Company, New York, N.Y., a corporation of Delaware
No Drawing. Filed May 15, 1961, Ser. No. 109,843
11 Claims. (Cl. 260—63)

This invention relates to new and improved compositions of modified diolefinic polymers. More specifically it relates to novel reaction products of cyclic unsaturated acid anhydrides with certain liquid polymers of diethylenically unsaturated hydrocarbons having conjugated double bonds, to a novel method for the preparation of such reaction products and to coatings prepared therefrom.

In the description of this invention, the term "polymer" is used to include both homopolymers of diolefinically unsaturated compounds and copolymers of diolefinically unsaturated compounds with various other compounds.

This invention is particularly applicable to liquid copolymers of mesityl oxide with conjugated diethylenically unsaturated hydrocarbons. These products, which were ony recently invented, are described in U.S. Patent No. 2,986,580 to P. A. Devlin. The products described in said patent are preferred starting materials for the production of the compositions of this invention. The disclosures of said patent with respect to the preparation and properties of the copolymers of mesityl oxide and diolefinically unsaturated hydrocarbons are incorporated herein by reference.

More broadly, the invention is applicable to certain liquid polymeric compositions of relatively low molecular weight, ranging from about 500 to about 8000, which are the products of the polymerization of a conjugated, diethylenically unsaturated hydrocarbon either alone, or with another similar co-monomer, or with a minor molar proportion of a polymerizable, olefinically unsaturated coreactant such as limonene, vinylcyclohexane, unsaturated carboxylic acids, unsaturated halides, unsaturated alcohols, unsaturated ethers, or unsaturated carbonyl compounds, or with 2 or more of these or similar co-reactants. The feature which distinguishes all liquid polymers suitable for use in this invention is that at least a substantial proportion of their diolefin units is added in 1,4-configuration. This means that a substantial part of the carbon-carbon double bonds in these polymers are present in the backbone of the polymer chain itself, and not in side groups which branch off from the chain. It will be apparent that the suitability of some of these copolymers may be adversely affected by inclusion of certain coreactants, e.g., such as cause steric hindrance of access to the internal double bond, and such as provide groups that are independently reactive with anhydride, causing undesired cross-linking.

For the diethylenically unsaturated hydrocarbon reactant may be employed those diolefins wherein the two double bonds are in conjugated relationship to one another, as in the case of the compounds 1,3-pentadiene, 2-methyl-1,3-butadiene, 2,4-hexadiene, 1,3-heptadiene, 2,4-undecadiene and similar dienes. In general, of this group, those conjugated dienes having no more than ten carbon atoms are preferred. Most preferred of all of the conjugated diethylenically unsaturated hydrocarbons in this invention is 1,3-butadiene.

Liquid polymers of the kind described are generally useful by virtue of their ability to act as drying oils, i.e., as drying ingredients in coating compositions such as paints. In some instances the polymers as such can be used to lay down useful surface coatings, as shown in said Devlin patent. This invention provides a method for producing novel modifications of these known products which are in some instances substantially superior to the unmodified product when used for the same purposes, e.g., in the production of surface coatings. Furthermore, the products of this invention have unique structures in that they are essentially linear polymers having a substantial number of dicarboxylic acid anhydride groups in each molecule, as well as a substantial number of carbon-carbon double bonds in the chain and usually a substantial number of vinylic carbon-carbon double bonds. The various comonomers which may be incorporated in the original polymer provide still further diversity of sites in each molecule. This great variety of sites present in each linear molecule establishes the products prepared according to this invention as very versatile intermediates for the production of coatings, flexibilizers for various resin compositions, surfactants, adhesives and the like. The compounds can also be used alone or in solution for the production of coatings having superior properties compared to the original polymer.

It is a primary object of this invention to provide a novel method for incorporating relatively large amounts of an organic cyclic unsaturated acid anhydride, e.g., up to 60% by weight or more, into certain liquid polymers of conjugated diolefinically unsaturated hydrocarbons which are characterized by a substantial proportion of 1,4-linkages in the polymer, to provide homogeneous products. It is another object to provide novel clear homogeneous liquid reaction products of certain liquid polymers of conjugated diolefinically unsaturated hydrocarbons with from 4 to about 15% by weight of an organic cyclic unsaturated acid anhydride. Another object is to provide novel homogeneous reaction products of such liquid polymers with 15 to 60% by weight or more of such an anhydride. A specific object is to provide novel, improved compositions of matter which consist of the reaction product of (1) copolymers of mesityl oxide with conjugated diolefinically unsaturated hydrocarbons with (2) maleic anhydride. It is another specific object to provide a method for incorporating substantial amounts of maleic anhydride, up to 60% by weight or more, into copolymers of mesityl oxide with conjugated diolefinically unsaturated hydrocarbons in the form of homogeneous compositions. Another specific object is to provide novel reaction products of maleic anhydride, e.g., from 0.1 up to 60% by weight or more, and copolymers of mesityl oxide with butadiene, said copolymers having molecular weights between about 500 and about 8000 and containing from 2 to 35% combined mesityl oxide. Other objects will appear from the following description of the invention.

In attempting to co-react mesityl oxide-diolefin copolymers with an anhydride it was found that special measures must be taken if clear liquid reaction products are to be made. It was found that when such diolefin copolymers are mixed with substantial concentrations of an anhydride, e.g., over one percent by weight, and the mixture brought to an elevated temperature and held for relatively long reaction times without the special precautions hereinafter detailed, the resulting products are not clear, homogeneous liquids but contain gelled, cross-linked materials dispersed in a liquid. Such products are not useful either for the preparation of metal coatings by direct application or for admixture with other components for the preparation of coatings. A novel method of preparing clear, liquid, homogeneous compositions of such diolefin copolymers with substantial amounts of an anhydride is one of the embodiments of this invention which will be described hereafter.

Other diolefinic polymers having a substantial proportion of 1,4-linkages but less than said mesityl oxide-diolefin polymers, e.g., between 30 and 40 percent, are still more difficult to convert to anhydride reaction products. Heating of such polymers at elevated temperatures for long periods of time according to methods heretofore known permits the introduction of only very small amounts of anhydrides.

The discovery which permits the incorporation of large concentrations of cyclic unsaturated acid anhydrides into polymers of conjugated diolefins, such as above described, to form clear, homogeneous reaction products, is the finding that homogeneous ungelled reaction products result when the liquid polymers are heated with substantial concentrations of anhydride for relatively short periods of time at moderate elevated temperatures, but in the absence of free redicals and free radical generating compounds. These conditions are assured by taking positive steps to avoid the presence of free oxygen, such as deaerating the reactants, providing an inert gas blanket for the reaction mixture and adding to the reaction mixture compounds which inhibit the formation of free radicals.

One embodiment of this invention is a method for the preparation of homogeneous reaction products of liquid polymers of conjugated diolefin hydrocarbons, such as described in detail hereinafter, with substantial amounts of organic cyclic unsaturated acid anhydride, e.g., up to 20% by weight or somewhat more. This method comprises heating a deaerated liquid mass of the polymer in the absence of oxygen, e.g., under a blanket of inert gas such as nitrogen, and in the presence of a small amount of a polymerization inhibitor, then adding anhydride, increasing the temperature to a desired final level, and maintaining that temperature for a sufficient time to cause the reaction to be substantially completed.

Another embodiment is a method for incorporating still greater amounts of anyhdride, e.g., up to 60% by weight or more, which comprises introducing the deaerated polymer into a heated liquid mass of the anhydride and heating the mixture with agitation while taking positive steps to prevent access of oxygen to the reaction and formation of free radicals, such as providing a nitrogen blanket and a polymerization inhibitor.

In preferred embodiments, the polymer used in the preparation of the reaction products according to the methods just described is a copolymer of mestyl oxide and a conjugated diolefin, most preferably butadiene, such as described in said Devlin patent, and the anhydride is maleic anhydride. More particularly preferred copolymers have molecular weights between about 500 and about 8000 and contain from 2 to 35% by weight combined mesityl oxide.

In another embodiment, this invention comprises as novel compositions of matter homogeneous reaction products of polymers of conjugated diolefin hydrocarbons, such as described hereinafter, with from 4% to 60% by weight or more of organic, olefinically unsaturated, cyclic anhydrides, the products containing from 4% to about 15% or somewhat more being clear, homogeneous, generally very viscous liquids, their viscosity increasing with anhydride content, and the product containing more than about 15% anhydride being progressively harder clear solidified liquids.

In another preferred embodiment, this invention comprises as novel compositions of matter the clear homogeneous reaction products of copolymers of conjugated diolefins and mesityl oxide such as described, and particularly those of butadiene and mesityl oxide, with up to 60% by weight or more of organic, olefinically unsaturated, cyclic anhydrides and particularly maleic anhydride.

REACTANTS

*The polymers*

The feature which distinguishes the liquid polymers suitable for use in this invention, as stated above, is that a substantial proportion of their diolefinic units is added in 1,4-configuration. Those polymers having a high proportion of 1,4-addition, e.g. 75% or more, lead to best results in that they permit greater ease of forming the desired anhydride addition product and incorporation of larger amounts of anhydride without formation of generally undesired cloudy reaction products. Useful results are obtained, however, with polymers having as little as 25%, but preferably at least between 30 and 40% 1,4-addition. The invention is, in general, applicable to liquid polymers having 25% or more 1,4-structure and having average molecular weights in the range from about 500 to about 8000 or somewhat higher.

The proportion of 1,4-addition in polymerization of conjugated olefinically unsaturated compounds is essentially a function of the reaction conditions, including the catalyst employed. These conditions determine the reaction mechanism and the resulting structure. Homopolymers and copolymers suitable for use in this invention result particularly from free-radical mechanisms, such as are found to occur in the presence of free radical generators, e.g., peroxides. Typical conditions for the preparation of such compounds are described in said Devlin patent. Useful liquid diolefinic polymers can also be prepared in ionic reactions catalyzed by Friedel-Crafts type catalysts, such as described in U.S. 2,550,695 to Hillyer et al. and in certain alkali metal catalyzed ionic reactions such as described in U.S. 2,631,175 to Crouch. The structure of the latter polymers is discussed in "Liquid Polybutadienes" by Crouch et al., Ind. and Eng. Chem., 47, 2091–2095 (1956). Several polymers which are useful in this invention are materials of commerce.

To provide an illustration of polymers used in one preferred embodiment of this invention, the mesityl oxide-diolefin copolymers and their preparation will be briefly described. More complete information concerning them is given in said Devlin patent. The diolefins which may be employed for producing the mesityl oxide-diolefin copolymers are any of the conjugated diolefinic hydrocarbons, but those having no more than 10 carbon atoms are preferred. Most preferred is 1,3-buatdiene, and this will generally be referred to in the following description.

In general, the preferred mode of preparing copolymers of mesityl oxide and diolefins consists of dissolving from 1 to 5 parts of diolefin in 10 parts of mesityl oxide and carrying out the polymerization in the liquid phase at temperatures between about 75° C. and 175° C. The reaction may be carried out without polymerization catalyst but is preferably carried out with from about 0.5 to about 40% by weight, based on diolefin, of a free radical generating polymeriaztion catalyst, suitably a peroxide and most preferably di-tert.butyl peroxide.

The mesityl oxide-diolefin copolymers are mobile to viscous, clear light colored liquids whose molecular weight is preferably between about 500 and about 8000, and most preferably between 700 and 5000. Copolymers containing from about 2 to about 35% combined mesityl oxide on a molar basis, and especially those containing from 3 to about 18% are preferred for the preparation of coating compositions.

The copolymers are soluble in aliphatic and aromatic hydrocarbon solvents such as isooctane or benzene, in ketones such as methyl ethyl ketone and in ethers such as ethyl ether.

Aside from the carbonylic content of these copolymers, they contain primarily polydiene structures. Approximately 20% of the butadiene is present as the 1,2-structure and approximately 80% is combined into the resin as the 1,4-addition product. When further characterized stereochemically, the product shows about 20% of the 1,4-addition product to exist in the cis form and about 80% of the 1,4-addition production in the trans form.

The 1,2-addition structure and the 1,4-addition structure of butadiene may be represented graphically as follows:

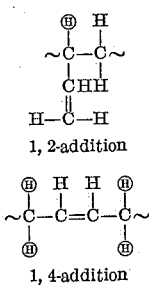

1, 2-addition 1, 4-addition

In these illustrations, the allylic hydrogen atoms, i.e., those hydrogens attached to a carbon atom which is directly connected to a carbon atom of a carbon-carbon double bond, are shown as ⓗ. The 1,4-structure contains four allylic hydrogens and the 1,2-structure only one. These allylic hydrogens are more reactive than other hydrogens in the molecule. It is believed that the addition of unsaturated anhydride to polymer, according to this invention, takes place predominantly by a direct addition mechanism at one of the allylic hydrogens in the chain, as illustrated.

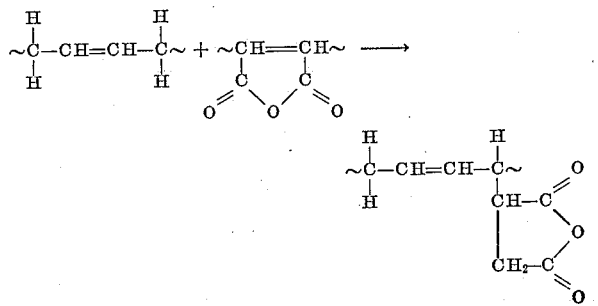

Other similar useful polymers are the copolymers of conjugated diolefins, alpha-beta-ethylenically unsaturated aldehyde, such as acrolein, and mesityl oxide, as described in copending U.S. Serial No. 101,634, now abandoned, of Devlin and Bergman, filed April 10, 1961.

*The anhydrides*

For reasons of convenience and suitability, it is generally preferred to use maleic anhydride in the practice of this invention. Useful results can also be obtained, however, by using in its place other organic, cyclic unsaturated acid anhydrides, such as tetrahydrophthalic, itaconic, citraconic, aconitic, dimethyl maleic or diethyl maleic anhydrides and the like. Anhydrides carrying non-hydrocarbon substituents may be used, as, for example, chloromaleic anhydride, chloroglutaconic anhydride or hydroxyglutaconic anhydride.

*Proportions of anhydrides*

The amount of anhydride which is incorporated into the polymer will depend on the use to which the composition is to be put. In the preferred polymers, any amount up to 60 percent by weight or more can be added to become a part of the polymer structure. At least several percent can be easily added even in the least preferred polymers.

Compositions containing from 2 to 20 percent anhydride are suitable for direct conversion to coatings by suitable application and drying procedures. They are also suitable for conversion to coatings by incorporation of diepoxides in amounts stoichiometrically equivalent to the anhydride present.

The flexibility of this invention in providing polymer compositions of any desired anhydride content is one of its great advantages.

CONDITIONS FOR THE FORMATION OF REACTION PRODUCTS

The reaction of polymers and anhydrides is carried out in the absence of oxygen and with precaution to prevent the presence of free radicals. Suitable precautions include, for example, deaeration of the liquid reactant or reactants, e.g., by blowing with an inert gas, sweeping out the reactor with an inert gas before the reagents are added, maintaining an inert gas blanket over the reaction mixture, and adding a free radical absorbing polymerization inhibitor to the reaction mixture.

Suitable inert gases are nitrogen, argon or hydrocarbon gases such as methane or ethane.

Numerous inhibitors for free radical polymerization are known. Typical examples of tert. amyl hydroquinone, hydroquinone, diphenylamine and 2,6-ditert.butyl-4-methylphenol. The amount of inhibitor of this type usually used in the reaction mixture in this invention is between 0.1 and 5 percent by weight.

The reaction is carried out at elevated temperatures. Typically it is about 90–100% complete in one hour at 190° C. Unduly long heating should be avoided. The degree of conversion of maleic and most other anhydrides can be readily determined by extracting a sample of the mixture with hot water—only uncombined anhydride being extracted—and titrating the extract.

If desired, the reaction may be carried out in any suitable solvent which is not reactive with the polymer or with the anhydride. Suitable solvents are, for example, aromatic or paraffinic hydrocarbons such as xylene, toluene, high boiling straight run mineral spirits and other non-reactive solvents preferably boiling above about 120° C. Mixtures of solvents may, of course, be employed. However, solvents are not necessary. The reaction is carried out in the liquid phase, conditions such as pressure and solvent compositions being adjusted to provide liquid conditions at the desired reaction temperatures.

METHODS OF PRODUCING REACTION PRODUCTS

The reactions of this invention may be carried out according to various methods, so long as the above described conditions are adhered to.

Typical for producing reaction products containing up to about 30% of anhydride is the following "Method A" while "Method B" is typical of methods suitable for preparing products containing as much as 60% or more anhydride.

*Method A*

A suitable kettle is swept out with an inert gas, conveniently nitrogen. Liquid polymer is placed in the kettle and nitrogen is bubbled through it for a suitable period to strip out any oxygen contained in it. Conveniently, the temperature of the kettle contents is raised during this time to a temperature in the range from 140° to 160° C. Polymerization inhibitor is added in the desired amount. Anhydride is then added to the reaction mixture, preferably in slight excess over the amount it is desired to incorporate into the polymer. The mixture is agitated and heated to a reaction temperature in the range from 160° to 250° C., preferably from 180° to 210° C., and most preferably from 180° to 190° C. The mixture is held at the reaction temperature at least until it is homogeneous, usually for a time from ½ hour to 1½ hours. A small amount of unreacted anhydride present in the product is then suitably removed by applying vacuum while the mixture is still at about the reaction temperature, preferably slightly below the maximum temperature. The product is then cooled and withdrawn to storage. If desired, solvent may be added to the product while it is still in the reaction kettle.

For the production of solid products containing from about 15 to about 30% anhydride, it is preferred to have some solvent in the kettle during the reaction and usually necessary for convenient handling to have solvent present at least before the excess anhydride is removed by distillation under vacuum.

Method B

When relatively small amounts of polymer are to be reacted with large amounts of anhydride, the latter is placed in an inert-gas filled kettle, melted if necessary, and blown with inert gas while the kettle is heated to from 140° to 160° C. Polymerization inhibitor and polymer are then added and the mixture heated to a reaction temperature in the range stated under "Method A." The mixture is held at the reaction temperature at least until it is homogeneous, usually for from ½ hour to 1½ hour. The amount of anhydride which combines increases with increased reaction times. At the end of the reaction, excess anhydride is stripped off and the product recovered as in Method A. This method is suitable for preparing products having from 10% to 60% or more of anhydride.

Solvent addition

It may sometimes be desirable to reduce the viscosity of the reaction products by adding a suitable solvent thereto. Such solvents may include, for example, aromatic hydrocarbons such as xylene, ketones such as methylisobutyl ketone, ether alcohols such as 2-methoxyethanol ("methyl Cellosolve") and numerous others. Mixed solvents may also be used. The amount of solvent may be adjusted to provide a desired viscosity of the resulting product, depending on the use to which it is to be put. A desirable viscosity for coating applications is, for example a value of E to F on the Gardner-Holdt viscosity scale. The amount of solvent is suitably such that the reaction product represents 10 to 90% by weight of the solution.

METHODS OF FORMING COATINGS

The reaction products of this invention are suitably converted to coatings by spreading them on metal surfaces in 0.1 to 2.0 mil thicknesses and baking them at such temperatures as about 150° to 260° C. particularly about 205° C. The reaction products form continuous, flexible, light colored protective coatings having excellent toughness, chemical and impact resistance. The adhesion to the metal backing in such coatings is superior to that in coatings produced from the copolymers without anhydride, although the latter also have a substantial adhesion to metal backing which is sufficient for many purposes. Substantially thicker films can be produced by applying the resin in greater thickness, e.g. 5–15 mils, and baking, for example, at 370° C. for 4 to 12 minutes.

In preparing coatings from the products of this invention, the coating may be laid down by known methods, such as spraying, brushing or "doctoring." For such methods, the product is dissolved in a suitable solvent, such as described above, to provide a solution which has the requisite viscosity and surface characteristics. Such solutions typically contain from 20 to 50 percent solids for the preparation of coatings of 0.1 to 2 mils thickness. Solution of much higher solids content, e.g. up to 90%, are used for preparation of thick coatings, e.g., up to 9 to 15 mils.

A particular advantage of the compositions of this invention involving copolymers of mesityl oxide and conjugated diolefins is that their metal wetting and pigment wetting properties are significantly improved over those of the copolymers without an anhydride. This may explain at least in part the improved adhesion of the baked films.

A further advantage of this invention is that additional coats of different thermoplastic materials, such as, for example, vinyl polymers or epoxy resins show superior adherence to films produced from compositions of this invention, compared to films of resins prepared without anhydrides.

Coatings prepared according to this invention also exhibit excellent resistance to chemicals, solvents and heat. The properties of these coatings make them particularly attractive for use in can coatings, tank linings, pipe coatings and linings, and similar applications where such outstanding properties are required.

The following examples further illustrate this invention but are not to be considered a limitation thereof.

EXAMPLE 1

A suitable copolymer for use in this invention is prepared by placing mesityl oxide in an autoclave, heating the vessel to 150° C. and adding during a period of several hours a solution of di-tert.butyl peroxide catalyst in mesityl oxide solution, and butadiene, until approximately 30 parts of butadiene and about 1.5 parts of catalyst per 100 parts of total reaction mixture have been added. Reaction is continued for a period of several hours after addition of reactant and catalyst is discontinued. Product is separated from the unreacted ingredients by Claisen distillation at about 2 millimeters at 150° C.

Copolymer produced in this manner typically has the following properties.

| | |
|---|---|
| Viscosity, Gardner-Holdt | Z6 to Z7 |
| Color, Gardner | 8 |
| Density, gm./ml. | 0.913 |
| Molecular weight | 2600 |
| Iodine value, gram I/100 g. (Wijs) | 450 |
| Carbonyl value, equivalents per 100 g. | 0.06 |
| Structure: | |
| Percent carbonyl, as mesityl oxide | 7.8 |
| Percent 1,4-addition of diene | 82 |
| Percent 1,2-addition of diene | 18 |

EXAMPLE 2

In the production of another suitable polymer, isoprene is substituted under otherwise equal reaction conditions for the butadiene of Example 1. A copolymer of similar properties is produced.

EXAMPLE 3

A reaction product of the polymer of Example 1 with about 2.5% maleic anhydride is prepared according to Method "A," supra. In this preparation, 294 parts of polymer and 1.5 parts of tertiary amyl hydroquinone (in the form of the commercial inhibitor "Sandovar A") are heated in an agitated kettle to 164° C. while being sparged with nitrogen. Nitrogen flow is discontinued, and 8.4 parts of freshly ground maleic anhydride added. The temperature is raised to 190° C. and held there for 65 minutes. During this period, the heterogeneous mixture of maleic anhydride and copolymer turns into a clear solution. A vacuum of 15 mm. mercury, absolute, is then pulled on the kettle and the mixture held at a temperature of 193° C. for 20 minutes to remove unconverted maleic anhydride. The product may then be recovered as is, or a small amount of solvent added to facilitate its removal from the kettle and further handling. Conveniently, the temperature of the product is reduced, 25 parts of methyl isobutyl ketone added, and the product removed for use as desired. The product contains about 2.2 percent maleic anhydride in combined form. The combined maleic anhydride content is determined by extracting unreacted maleic anhydride from the reaction product by means of hot water and then titrating the aqueous extract to determine the amount of uncombined maleic anhydride.

Equally good results are obtained when hydroquinone or diphenylamine or 2,6-di-tert.butyl-4-methylphenol are substituted for the tert. amyl hydroquinone inhibitor.

EXAMPLE 4

A reaction product of the polymer of Example 1 with about 5% maleic anhydride is prepared according to Example 3. In this preparation, the amount of polymer is 272 parts, tert. amyl hydroquinone 1.3 parts, and maleic anhydride 15.5 parts. Maleic anhydride is added at a temperature of 155° C., the reaction is carried out for 80 minutes at 190° C. and the product vacuum stripped at 180° C. and 16 mm. mercury for 15 minutes. 25 parts of methylisobutyl ketone is added, providing a solution containing 92% solids. The product contains 5.2 percent maleic anhydride in combined form.

EXAMPLE 5

A reaction product containing about 10 percent maleic anhydride is prepared according to Example 4 by doubling the amount of maleic anhydride in the reaction mixture, conditions remaining otherwise unchanged.

EXAMPLE 6

A reaction product containing about 20 percent of maleic anhydride is prepared according to Example 4 by quadrupling the amount of maleic anhydride in the reaction mixture, conditions remaining otherwise unchanged. For convenience, the amount of solvent used in recovering product is increased to 56 parts, providing a solution containing about 80 percent solids.

EXAMPLE 7

A reaction product of the polymer of Example 1 with about 60 percent maleic anhydride is prepared according to Method B supra. In this preparation, a mixture of 446 parts of maleic anhydride, 78 parts of the copolymer of Example 1 and 0.2 part of tert. amyl hydroquinone are placed in a kettle and sparged with nitrogen for one half hour at 100° C. The maleic anhydride is a liquid under these conditions. The temperature is raised to 195° C. The mixture begins to clear after 15 minutes reaction; after 30 minutes it is a clear solution. Reaction is continued an additional 30 minutes. Excess maleic anhydride is then distilled off under vacuum. 192 grams of resin is recovered which contains 62.5% maleic anhydride. The resin is dissolved in methyl ethyl ketone, for ease of handling and later the solution placed under vacuum at 85° C. and less than 5 mm. mercury for 4 hours to remove solvent and remaining traces of maleic anhydride. The resulting product is a clear, brown, horny, almost rubbery resin with unusual properties as a chemical intermediate, for example for the production of novel surfactants or as a cocuring resin with diepoxides.

EXAMPLE 8

The preparations of Examples 3–7 are repeated with the polymer of Example 2 substituted for the polymer of Example 1, leading to the production of homogeneous reaction products containing maleic anhydride in combined form.

EXAMPLE 9

The preparations of Examples 1–8 are repeated with the polymer of Example I of said Devlin and Bergman patent application substituted for the polymer of Example 1 hereof, leading to the production of homogeneous reaction products containing maleic anhydride in combined form.

The polymer was a viscous, light-colored copolymer of 83% by weight of butadiene, about 11% by weight of acrolein and about 6% by weight of mesityl oxide and had a molecular weight of 1500.

EXAMPLE 10

The preparations of Examples 1–9 are repeated with equal weights of citraconic anhydride, dimethyl maleic anhydride and chloroglutaconic anhydride, respectively, used in place of maleic anhydride, leading to the production of homogeneous reaction products containing the several anhydrides in combined form.

EXAMPLE 11

Portions of the products of Examples 3–10 are dissolved in methyl isobutyl ketone and others in xylene to provide solutions having solids contents of 25%, 35% and 50%. Portions of these solutions are applied to tin-plated steel plates by spreading on with a metal doctor blade, spraying and brushing, respectively. The coated metal plates are baked at 150° to 260° C. for periods varying from 15 minutes to one hour, the higher temperatures and longer periods being used for the thicker films. A typical temperature is about 205° C. for films of about 0.2 mil.

The resulting coatings, having thicknesses in the range from 0.1 to 2 mils, exhibit excellent adhesion to the substrate and outstanding resistance to chemicals, solvents and heat. When top coats of various vinyl resins are applied to the coatings and baked on, the intercoat adhesion is also found to be outstanding.

EXAMPLE 12

Portions of the products of Examples 3–10 are dissolved in methyl isobutyl ketone and others in xylene to provide solutions having solids content of about 90%. Portions of those solutions are applied to steel plates in sufficient thickness to provide coatings of 9 to 15 mils thickness. These are baked 4–12 minutes at about 370° C. Excellent coatings are obtained, exhibiting very good resistance to solvents, acids and bases.

I claim as my invention:

1. The method which comprises heating at a temperature of at least about 180° C. a mixture of a liquid copolymer of mesityl oxide and butadiene, having a molecular weight between about 700 and 5000, containing from 2 to 35% combined mesityl oxide and at least about 80% of its diene units added in 1,4-configuration, with maleic anhydride and an effective small amount of a free-radical polymerization inhibitor while excluding free oxygen until the mixture becomes a homogeneous liquid.

2. The method which comprises heating at a temperature of at least about 180° C. a mixture of a liquid polymer of a conjugated diethylenically unsaturated hydrocarbon of from 4 to 10 carbon atoms, having an average molecular weight between about 700 and about 5000 and having over 25% of its diolefinic units added in 1,4-configuration, with an organic, unsaturated cyclic anhydride and an effective small amount of a free-radical polymerization inhibitor while excluding free oxygen until the mixture becomes a homogeneous liquid.

3. The method which comprises heating in an inert atmosphere to a temperature below 180° a stirred mixture of a free-oxygen-free liquid polymer of a conjugated diethylenically unsaturated hydrocarbon of from 4 to 10 carbon atoms, having an average molecular weight between about 700 and about 5,000 and having over 25% of its diolefinic units added in 1,4-configuration, with an effective amount in the range from 0.1–5% by weight of a free-radical polymerization inhibitor, admixing up to 30 percent by weight of an organic unsaturated cyclic anhydride, increasing the temperature to at least about 180°, maintaining the stirred mixture at that temperature until the mixture becomes a homogeneous liquid, removing excess unreacted anhydride from the mixture and recovering the resulting reaction product.

4. The method which comprises heating in an inert atmosphere an organic unsaturated cyclic anhydride at least above its melting point, adding thereto an effective small amount of a free-radical polymerization inhibitor and up to four times its weight of a free-oxygen-free liquid polymer of a conjugated, diethylenically unsaturated hydrocarbon of from 4 to 10 carbon atoms, having a molecular weight between about 700 and about 5,000 and having over 25 percent of its diolefinic units added in 1,4-configuration, reacting the mixture with agitation, while excluding oxygen, at a temperature of at least about 180° C. until the mixture becomes a homogeneous liquid, removing excess unreacted anhydride from the mixture and recovering the resulting reaction product.

5. The method which comprises heating in an inert atmosphere to a temperature below 180° C. a stirred mixture of a free-oxygen-free liquid copolymer of mesityl oxide and butadiene having a molecular weight between about 700 and 5,000, containing from 2 to 35% combined mesityl oxide and at least about 80% of its diene units in 1,4-configuration, with an effective amount in the range from 0.1 to 5% by weight of a free-radical polymerization inhibitor, admixing up to 30% by weight of maleic anhydride, increasing the temperature to at least about 180° C., maintaining the stirred mixture at that temperature for a time in the range from about ½ to about 1½ hours, at least until the mixture becomes a homogeneous liquid, removing excess unreacted maleic anhydride from the mixture and recovering the resulting reaction product.

6. The method which comprises heating in an inert atmosphere maleic anhydride at least above its melting point, adding thereto an effective small amount of a free-radical polymerization inhibitor and up to four times its weight of a free-oxygen-free liquid copolymer of mesityl oxide and butadiene having a molecular weight between about 700 and 5,000, containing from 2 to 35% combined mesityl oxide and at least about 80% of its diene units in 1,4-configuration, reacting the mixture with agitation, while excluding oxygen, at a temperature of at least about 180° C. for a time in the range from ½ to about 1½ hours until the mixture becomes a homogeneous liquid, removing excess unreacted maleic anhydride from the mixture and recovering the resulting reaction product.

7. The homogeneous reaction product of (1) a liquid copolymer of mesityl oxide and butadiene having a molecular weight between about 700 and 5,000, containing from 2 to 35% combined mesityl oxide and at least about 80% of its diene units added in 1,4-configuration, and (2) from 0.1 to about 60% by weight thereof of maleic anhydride.

8. A composition of matter according to claim 7 which is a clear viscous liquid, free of gel, and in which the proportion of combined anhydride is from 0.1 to about 15%.

9. The homogeneous product of reacting at a temperature of at least about 180° C. in an inert atmosphere and in the absence of free radicals and free radical-generating compounds: (1) a liquid polymer of a conjugated diethylenically unsaturated hydrocarbon of from 4 to 10 carbon atoms, having a molecular weight between about 700 and 5,000, and having over 25% of its diolefinic units added in 1,4-configuration, wherein said conjugated diethylenically unsaturated hydrocarbon is the sole hydrocarbon component, with (2) from 4 to about 60% by weight of an organic unsaturated cyclic anhydride selected from the group consisting of maleic, chloromaleic, tetrahydrophthalic, itaconic, citraconic, aconitic, dimethyl maleic, diethyl maleic, chloroglutaconic and hydroxyglutaconic anhydrides; said product being an essentially linear polymer, having essentially all monomeric anhydride units essentially all dependent from the diene polymer.

10. A composition of matter according to claim 9 which is a clear, viscous liquid, free of gel, and in which the proportion of combined anhydride is from 4% to about 15%.

11. A composition of matter according to claim 9 which is a clear, homogeneous solid, free of gel, and in which the proportion of combined anhydride is in excess of 15%.

References Cited by the Examiner

UNITED STATES PATENTS

| | | | |
|---|---|---|---|
| 2,142,980 | 1/39 | Huijser et al. | 260—78.4 |
| 2,858,281 | 10/58 | Bauman et al. | 260—78.4 |
| 2,986,580 | 5/61 | Devlin | 260—63 |

LEON J. BERCOVITZ, *Primary Examiner.*

HAROLD N. BURSTEIN, *Examiner.*